US006993338B2

(12) United States Patent
Lee et al.

(10) Patent No.: US 6,993,338 B2
(45) Date of Patent: Jan. 31, 2006

(54) CODE COMBINING SOFT HANDOFF METHOD

(75) Inventors: Young Jo Lee, Kyonggi-do (KR); Ki Jun Kim, Seoul (KR); Soon Yil Kwon, Kyonggi-do (KR); Jong Hoe An, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 471 days.

(21) Appl. No.: 09/899,067

(22) Filed: Jul. 6, 2001

(65) Prior Publication Data

US 2002/0004397 A1 Jan. 10, 2002

(30) Foreign Application Priority Data

Jul. 8, 2000 (KR) ........................................ 2000-39088
Jul. 10, 2000 (KR) ........................................ 2000-39384

(51) Int. Cl.
*H04Q 7/20* (2006.01)

(52) U.S. Cl. ........................ 455/442; 455/436; 455/437; 455/438; 455/450; 370/328; 370/331; 370/332

(58) Field of Classification Search ................ 455/436, 455/442, 450–452.2; 370/328, 331, 332
See application file for complete search history.

(56) References Cited

U.S. PATENT DOCUMENTS

| 5,640,414 | A | * | 6/1997 | Blakeney et al. | ............ 375/130 |
| 5,652,748 | A |  | 7/1997 | Jolma et al. | ................. 370/320 |
| 5,907,582 | A |  | 5/1999 | Yi | ............................... 375/259 |
| 5,970,085 | A |  | 10/1999 | Yi | ............................... 375/200 |
| 5,978,365 | A | * | 11/1999 | Yi | ............................... 370/331 |
| 6,061,387 | A |  | 5/2000 | Yi | ............................... 375/142 |
| 6,094,427 | A |  | 7/2000 | Yi | ............................... 370/331 |
| 6,542,744 | B1 | * | 4/2003 | Lin | ............................. 455/437 |

FOREIGN PATENT DOCUMENTS

| WO | WO99/60809 | 11/1999 |
| WO | WO99-60809 | * 11/1999 |
| WO | WO00/24146 | 4/2000 |

OTHER PUBLICATIONS

Byung K. Yi, The Softest Handoff Design Using Iterative Decoding (Turbo Code),3GPP2/TSG–C30 20000328–009, Mar. 28, 2000, 31 pgs.
Byung K. Yi The Softest Handoff Design Using Iterative Decoding (Turbo Code),3GPP2/TSG–C30 20000328–009R1, Mar. 28, 2000, 31 pgs.
Byung K. Yi, The Novel Handoff for 3GPP2 Using Code Combining, Packet Combining and Turbo Coding, C30–200001/1/004, 3GPP2 TSG–C WG 3 Physical Layer, Jan. 11, 2000, 39 pgs.
Soon Yil Kwon et al., Simulation Results of Coding Diversity Soft Handoff Design, 3GPP2/TSG–C30 20000426–006, Apr. 26, 2000, 29 pgs.
TIA/EIA Interim Standard, Introduction for CDMA2000 Standards for Spread Spectrum Systems, TIA/EIA/IS–2000.1–A, Mar. 2000, 5 sheets (8 pages per sheet).
TIA/EIA Interim Standard, Upper Layer (Layer 3) Signaling Standards for CDMA2000 Standards for Spread Spectrum Systems, TIA/EIA/IS–2000.5–A, Mar. 2000, 433 pgs.

* cited by examiner

*Primary Examiner*—Stephen M. D'Agosta
(74) *Attorney, Agent, or Firm*—Fleshner & Kim, LLP

(57) ABSTRACT

A code combining soft handoff method is disclosed. A mobile terminal measures a strength of respective pilot signals received from a plurality of base stations. If the strength of the received pilot signal is higher than a given value, a base station controller allocates a new code pattern to the corresponding base station to additionally receive a signal from the base station. If the strength of the received pilot signal is lower than the specified value, it drops a signal of the corresponding base station. The mobile terminal and the base station change the code pattern of one of the signals from the two base stations into a code pattern different from the code pattern of the other signal.

51 Claims, 7 Drawing Sheets

| Field | Length(bits) |
|---|---|
| NUM_PILOTS | 6 |

NUM_PILOTS occurrences of the following record:

| PILOT_PN | 9 |
|---|---|
| PUNCTURE_PATTERN | 2 |

| Field | Length(bits) |
|---|---|
| NUM_PILOTS | 6 |

NUM_PILOTS occurrences-of-the-following record:

| PILOT_PN | 9 |
|---|---|
| PUNCTURE_PATTERN | 2 |
| USE_SWAP_TIME | 0 or 1 |
| SWAP_ACTION_TIME | 0 or 6 |

| A | B | C |
|---|---|---|
| 1 | 2 | 3 |
| 1 | 3 | 2 |
| 2 | 1 | 3 |
| 2 | 3 | 1 |
| 3 | 1 | 2 |
| 3 | 2 | 1 |

(b)

| Active set |
|---|
| A(a), B(b) |
| A(a), C(b) |
| A(a), B(b) |
| A(a), C(b) |
| B(b), C(a) |
| B(b), C(a) |

CODE COMBINING SOFT HANDOFF METHOD

BACKGROUND OF THE INVENTION

1. Field of the Invention

The present invention relates to a mobile communication system, and more particularly to a code combining soft handoff (CCSH) method.

2. Background of the Related Art

In mobile communications, a handoff is an automatic switchover of the current traffic channel that occurs when a mobile terminal moves from one cell to another cell. Such a handoff is typically classified into a hard handoff and a soft handoff. The hard handoff first breaks the existing communication channel before opening a new traffic channel, and the soft handoff first connects a new channel and then breaks the existing channel.

In other words, according to the hard handoff, when a mobile communication terminal (i.e., mobile station) moves from one base station to another base station, the channel connected to the existing base station is broken, and then a new channel of the new base station is connected.

According to the soft handoff that is a handoff between cells, when a mobile communication terminal (i.e., mobile station) comes near another cell region having the same frequency while the mobile terminal is in use, the mobile terminal detects and informs the current cell that the signal strength of the pilot signal of a new cell is sufficiently high, and the new cell opens a traffic channel for the mobile terminal with the new base station. At this time, the mobile terminal simultaneously maintains communication through the traffic channels of the two cells.

As the mobile terminal approaches the new cell, the signal of the previous cell becomes weaker. If the strength of this previous signal is lower than a predetermined level, the mobile terminal informs the two cells of this fact, and then the previous cell breaks the communication channel through the mobile station. The mobile terminal thus continues the call through the new cell of a good signal state.

A softer handoff is a handoff between different sectors of one cell. According to the softer handoff, one cell is divided into several sectors, and when the mobile terminal in use moves from one sector to another sector within the same base station, the traffic channel is connected in the same manner as the soft handoff.

Meanwhile, a high-speed data transmitting system uses a CCSH (also known as a code combining and packet combining) handoff method using turbo coding. According to the CCSH, one signal is encoded by different coding methods, and resultant coded signals are transmitted. A receiving part decodes and combines the signals encoded by the different coding methods to obtain a gain. According to the CCSH handoff method, several base stations transmit the signals encoded by different coding methods from the various base stations and a mobile terminal receives and combines the signals encoded by the different coding methods to obtain the gain. If the mobile terminal receives the signals encoded by the same coding method, however, it obtains no gain.

Specifically, as shown in FIG. 1, data to be transmitted to a base station is outputted from a master switch center 101 of a base station controller. The data is then inputted to a turbo encoder 101b, which encodes the data. The turbo encoder 101b then outputs two signals encoded with different patterns.

The two signals are transmitted to the respective base stations with pilot signals from respective pilot channel sections 102a and 102b included therein. The transmitted signals are then received by the mobile terminal from each of the respective base stations. The mobile terminal decodes and combines the two signals encoded with different patterns to obtain the gain.

Meanwhile, according to the CCSH handoff method, the respective base station is allocated with a PN number for discrimination among base stations and cell regions that transmit/receive signals to/from the mobile terminal. In transmitting/receiving the signals to/from the mobile terminal, the respective base stations are under the control of the base station controller, and have different code patterns.

Here, the mobile terminal receives the signals with specified code patterns from all the base stations located in the cell region where the mobile terminal itself is included. Since two code patterns can be used in the CCSH handoff method, the more than 3-way handoff method allocates two code patterns with the permission of overlapping of the respective base stations.

Specifically, when the mobile terminal moves between cells, it moves through a 2-way or 3-way handoff regions where two or three cells of the base stations overlap. Since two code patterns are allocated to the base station, one of the two code patterns is allocated if the signal is received from one base station. If the signal is received from two base stations, the two code patterns are allocated to the two base stations, respectively. Thus, the mobile terminal receives a first code pattern from the first base station and a second code pattern from the second base station.

If the signal is received from three base stations, however, one of the two code patterns is allocated twice. That is, two code patterns are allocated with the permission of overlapping of the respective base stations.

The 2-way or 3-way region indicates the number of base stations from which the mobile terminal simultaneously receives the signal. Thus, a mobile terminal receives a signal from two base stations in a 2-way region, and receives a signal from three base stations in a 3-way region. The number of base stations from which a mobile terminal receives a signal is determined in accordance with the level of the pilot signal received from the respective base station. If the level of the pilot signal received from the base station is higher than a predetermined value, the mobile terminal additionally receives the signal of the corresponding base station, while if the level of the pilot signal is below the predetermined level, the mobile terminal drops the signal of the base station not to be received. The 2-way or 3-way region is thus determined.

Now, a related code combining handoff method will be explained with reference to the accompanying drawings.

Referring to FIGS. 2, 3, and 4, A to C base stations 201, 202, and 203 are allocated with PN numbers a, b, and c, respectively, for discrimination among base stations. In neighboring portions of the base stations exist 2-way (210a, 210b, and 210c) and 3-way (220) handoff regions where the signal is received from two and three of the base stations 201, 202, and 203, respectively.

First, if the mobile terminal 205 in the cell region of the A base station 201 is in an operation state, it receives the signal from the A base station 201, is allocated with a code pattern $\alpha$, and thus receives the signal of the A base station 201 with the code pattern $\alpha$.

At this time, the mobile terminal 205 receives an extended supplemental channel assignment message (ESCAM) from a new base station, and determines with which code pattern the mobile terminal 205 and the base station initially communicate. The ESCAM includes a PILOT_PN field and a PUNCTURE_PATTERN (also called CCSH_TYPE) field. The PILOT_PN field includes the PN code allocated to the respective base stations 201, 202, and 203, and discriminates from which base station the ESCAM message is received. The PUNCTURE_PATTERN field informs which code pattern the corresponding base station uses. For example, for discrimination among the base stations, the A base station 201 is allocated with the PN number a, the B base station 202 with the PN number b, and the C base station 203 with the PN number c. Also, if information defined in the PUNCTURE_PATTERN is 00, no code pattern is used. If the information is 01, the code pattern α is allocated as the code pattern of the base station that transmitted the ESCAM, while if the information is 10, a code pattern β is allocated as the code pattern of the base station that transmitted the ESCAM. It should be understood that the code pattern could be a puncture code pattern, or any other coding scheme.

Since there are two code patterns, at least three cases including an unusable state should be defined. Accordingly, the PUNCTURE_PATTERN field requires at least 2 bits.

Though the signal is received from the B base station 202 and the C base station 203, the mobile terminal disregards this since the signal is weak.

Meanwhile, as the mobile terminal 205 gradually approaches the B base station 202, the pilot signal strength of the signal received from the B base station 202 becomes greater. The mobile terminal 205 detects whether the pilot signal strength of the signal received from the B base station 202 is higher than a specified value, and if the pilot signal strength of the B base station 202 becomes higher than the specified value, the mobile terminal 205 transmits an extended pilot strength measurement message (EPSMM) to the respective base stations to indicate as such, and allocates the code pattern β to the B base station 202. The respective base stations transmit an universal handoff direction message (UHDM) to the mobile terminal 205 to inform this. The mobile terminal 205 receives the code pattern α (or of a default encoder type) from the A base station 201, receives the code pattern β (or of a complementary encoder type) from the B base station 202, and transmits an extended handoff completion message (EHCM) to the respective base stations to complete the handoff.

Here, the fact that the pilot signal of the B base station 202 becomes higher than the specified value means that the mobile terminal 205 at least enters into the 2-way handoff region 210a where the A base station 201 and the B base station 202 overlap.

If the mobile terminal 205, which is in the 2-way handoff region 210a of the A base station 201 and the B base station 202, gradually approaches the C base station 203, the strength of the signal received from the C base station 203 becomes greater. If the pilot signal strength of the C base station 203 becomes higher than the specified value, the mobile terminal 205 transmits an EPSMM to the respective base stations to inform this, and allocates one of the code patterns, which were allocated to the A base station 201 or to the B base station 202, to the C base station 203. The respective base stations transmit an UHDM to the mobile terminal 205 to inform this. The mobile terminal 205 receives the signal from the C base station 203, and transmits an EHCM to the respective base stations to complete the handoff.

Here, the fact that the pilot signal of the C base station 203 becomes higher than the specified value means that the mobile terminal 205 enters into the 3-way handoff region 220 where the A base station 201, B base station 202, and C base station 203 overlap.

If the code pattern α is allocated to the C base station 203, the mobile terminal 205 receives the signal of the code pattern α from the A base station 201 and the C base station 203, and receives the signal of the code pattern β from the B base station 202.

At this time, the mobile terminal 205 receives, decodes, and combines the signals of different code patterns α and β, and thus a signal of a better quality can be produced by the diversity effect to obtain a gain.

The allocation of the code patterns to the base stations is performed by the base station controller (not illustrated) which receives information from the respective base stations. That is, the base station controller allocates different code patterns in the 2-way handoff region, and allocates two code patterns to three base stations with the permission of overlapping in the 3-way handoff region.

Here, if the mobile terminal 205 in the 3-way handoff region 220 moves to the cell region of the A, B, or C base station 201, 202, or 203, only one code pattern corresponding to the base station remains, and the signals of the remaining two base stations are dropped because the level of the pilot signals of the two base stations becomes lower than the specified value. The mobile terminal consequently receives the signal from the corresponding remaining base station only.

If the mobile terminal 205 in the 3-way handoff region 220 moves to the 2-way handoff region 210a of the A and B base stations 201 and 202, or to the 2-way handoff region 210b of the B and C base stations 202 and 203, the respective signal of the C base station 203 or of the A base station 201 is dropped, and thus the mobile terminal 205 receives the signals from the B and C base stations 202 and 203, or from the A and B base stations 201 and 202.

At this time, since the A and C base stations 201 and 203 use the code pattern α, and the B base station uses the code pattern β, there exists no problem in performing the code combining handoff method that receives, decodes, and combines the signals of different code patterns, and obtains a gain.

If, however, the mobile terminal 205 in the 3-way handoff region 220 moves to the 2-way handoff region 210c of the A and C base stations 201 and 203, the signal from the B base station 202 is dropped, and the mobile terminal 205 receives the signals from the A and C base stations 201 and 203. In this case, since both the A and C base stations 201 and 203 use the code pattern α, no gain can be obtained by the code combining handoff method.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention to provide a CCSH handoff method in a 3-way handoff region that substantially obviates one or more of the problems due to limitations and disadvantages of the related art.

Another object of the present invention is to provide a CCSH handoff method in a 3-way handoff region that can obtain a gain of the CCSH handoff method by making a mobile terminal always receive signals encoded by two different code patterns in the handoff region.

Another object of the present invention is to provide a CCSH handoff method in a 3-way handoff region that can prevent the gain reduction of the CCSH handoff by preventing code patterns from becoming identical when a mobile terminal moves from the 3-way handoff region to a 2-way handoff region.

In order to achieve at least these objects, in whole or in parts, there is provided a method where if the code patterns allocated to the two base stations in a 2-way handoff region are identical when the mobile terminal moves from the 3-way handoff region to the 2-way handoff region, the code pattern of either one of the two base stations in the 2-way handoff region changed into a different code pattern, and if the mobile terminal moves to the 3-way handoff region, the different code patterns are allocated to only two base stations whose pilot signal strength is high.

To further achieve at least these objects in whole or in parts, there is provided a code combining soft handoff method (CCSH), comprising measuring a strength of respective pilot signals received from a plurality of base stations, if the strength of the received pilot signal is higher than a prescribed value, allocating a first code pattern to the corresponding base station to receive a signal from the base station, and if the strength of the received pilot signal is lower than the prescribed value, dropping a signal of the corresponding base station; and changing the first code pattern of a signal from a second of two base stations to a second code pattern different from the first code pattern if the code patterns of signals from the two base stations are the first code pattern when the mobile terminal receives the signals from the two base stations.

To further achieve at least these objects in whole or in parts, there is provided a handoff method, comprising measuring a strength of pilot signals received from a plurality of base stations, if the strength of the received pilot signal is higher than a prescribed value, allocating a new code pattern to the corresponding base station to additionally receive a signal from the base station, and if the strength of the received pilot signal is lower than the prescribed value, dropping a signal of the corresponding base station; and if signals are received from three base stations, allocating different code patterns to the signals from two of the three base stations whose pilot signal strengths are high among the signals from the three base stations, and receiving the signals from the two active-state base stations.

To further achieve at least these objects in whole or in parts, there is provided a method of performing a handoff in a mobile communication system, comprising transmitting a power strength measurement message to a target base station while maintaining communications with a first base station using a first code pattern; receiving a handoff direction message from the target base station, including an initial code pattern to be used by the target base station; transmitting a handoff complete message to the target base station when communication is established with the target base station; and changing the initial code pattern used with the target base station to a second code pattern at a prescribed time if the initial code pattern is the first code pattern.

To further achieve at least these objects in whole or in parts, there is provided A handoff direction message for use in a mobile communication system, comprising a pilot PN code, to identify a target base station; a puncturing pattern, to indicate a first code pattern of a bit stream transmitted by the target base station; a switching indicator, to indicate if the first code pattern of the target base station will be switched to a second code pattern; and a switching time, to indicate when the first code pattern will be switched if the switching indicator indicates that the first code pattern will be switched.

To further achieve at least these objects in whole or in parts, there is provided a subscriber unit of a mobile communication system, comprising means for providing communication with a first base station using a first code pattern; means for receiving a handoff direction message from a target base station, including an initial code pattern to be used by the target base station; means for transmitting a handoff complete message to the target base station when communication is established with the target base station; and means for synchronizing a change of the initial code pattern used with the target base station to a second code pattern at a prescribed time if the initial code pattern is the first code pattern.

To further achieve at least these objects in whole or in parts, there is provided a base station in a communication system, comprising means for transmitting a PN code to a mobile station to uniquely identify the base station among a plurality of base stations; means for receiving a power strength measurement message from the mobile station; means for transmitting a handoff direction message to the mobile station, the handoff direction message including an initial code pattern to be used by the base station, a switching indicator, to indicate if the initial code pattern station will be switched to a second code pattern, and a switching time, to indicate when the code pattern will be switched; means for receiving a handoff complete message from the mobile station when communication is established; and means for changing the initial code pattern to the second code pattern at the time indicated in the handoff direction message if it is determined that the code pattern needs to be switched.

To further achieve at least these objects in whole or in parts, there is provided a CCSH handoff method, including measuring a strength of respective pilot signals received from a plurality of base stations, if the strength of the received pilot signal is higher than a prescribed value, allocating a new code pattern to the corresponding base station to additionally receive a signal from the base station, and if the strength of the received pilot signal is lower than the prescribed value, allocating a new code pattern to the corresponding base station to additionally receive a signal from the base station, and if the strength of the received pilot signal is lower than the specified value, dropping a signal of the corresponding base station; and changing the code pattern of one of signals from the two base stations into a code pattern different from the code pattern of the other of the signals from the two base stations if the code patterns of the signals from the two base stations are identical when the mobile terminal receives the signals from the two base stations.

Here, it is preferable that the change of the code patterns of the signals from the base stations is performed to match a code pattern changing time set for coincidence of operations of the base station and the mobile terminal. It is also preferable that a CCSH_ENC_ACTION_TIME (also called SWAP_ACTION_TIME) field be added to a UHDM sent from the base station to the mobile terminal, and the code pattern changing time be defined in the CCSH_ENC_ACTION_TIME field.

Furthermore, it is preferable that the CCSH_ENC_ACTION_TIME field be composed of 6 bits to define 64 kinds of code pattern changing times, and the code pattern changing time defined in the CCSH_ENC_ACTION_TIME field is defined in the unit of 80 ms that is the unit of a system time. It is also preferable that a determination of whether to apply the code pattern changing time be determined and defined in the UHDM sent from the base station to the mobile terminal. It is also preferable that a determination of whether to apply the code pattern changing time be defined in a USE_CCSH_ENC_TIME (also called USE_SWAP_TIME) field by adding the USE_CCSH_ENC_TIME field to the UHDM.

To further achieve at least these objects in whole or in parts, there is provided a CCSH handoff method, including a mobile terminal measuring a strength of pilot signals received from a plurality of base stations, if the strength of the received pilot signal is higher than a specified value, allocating by the BSC a new code pattern to the corresponding base station to additionally receive a signal from the base station, and if the strength of the received pilot signal is lower than the specified value, dropping a signal of the corresponding base station; and if signals are received from the three base stations, the BSC allocating different code patterns to the signals from the two base stations whose pilot signal strength is high among the signals from the three base stations, determining the two base stations as in an active state, and receiving the signals from the two active-state base stations.

Here, it is preferable that if the mobile terminal, while receiving the signal from one of the base stations, moves to the 3-way handoff region, and receives signals from two active-state base stations whose pilot signal strength is high, the mobile terminal receives the signals in a manner that it maintains the code pattern allocated to the base station from which the signal is received as it is, and the BSC allocates a code pattern different from that of the base station from which the signal is received to the base station newly determined as in the active state.

It is also preferable that if the base station from which the mobile terminal receives the signal is not newly determined as in the active state in the 3-way handoff region, the mobile terminal receives the signals by allocating the different code patterns to the two base stations newly determined as in the active state.

It is also preferable that if the mobile terminal moves from the 2-way handoff region where the mobile terminal receives the signals from the two base stations to the 3-way handoff region, and receives the signals from the two active-state base stations whose pilot signal strength is high, the mobile terminal receives the signals in a manner that it maintains the code pattern allocated to the base station which is determined as in the active state and from which the signal is received as it is, and the BSC allocates a code pattern different from that of the base station from which the signal is received to the base station newly determined as in the active state.

It is also preferable that if the mobile terminal, while receiving the signals from the two active-state base stations whose pilot signal strength is high in the 3-way handoff region, moves to the 2-way handoff region, and receives signals from the base stations corresponding to the 2-way handoff region, the mobile terminal receives the signals in a manner that it maintains the code pattern allocated to the base station which is determined as in the active state and from which the signal is received as it is, and the BSC allocates a code pattern different from that of the base station from which the signal is received to the base station newly determined as in the active state.

It is also preferable that if the pilot signal strength of the subject base station from which no signal is received becomes higher than the pilot signal strength of the active-state base station in a state that the mobile terminal receives the signals from the two active-state base stations whose pilot signal strength is high in the 3-way handoff region, the mobile terminal determines the subject base station as the new active-state base station to receive the signal therefrom, drops the signal from the base station having the pilot signal whose strength is lower than the pilot signal strength of the subject base station, and the BSC allocates the different code patterns to the two active-state base stations by allocating the code pattern allocated to the dropped base station to the subject base station.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 9 is a drawing illustrating base stations selected as in an active state in a CCSH handoff method according to a second embodiment of the present invention.

DETAILED DESCRIPTION OF PREFERRED EMBODIMENTS

Reference will now be made in detail to the preferred embodiments of the present invention, examples of which are illustrated in the accompanying drawings.

First Embodiment

Figure 5:
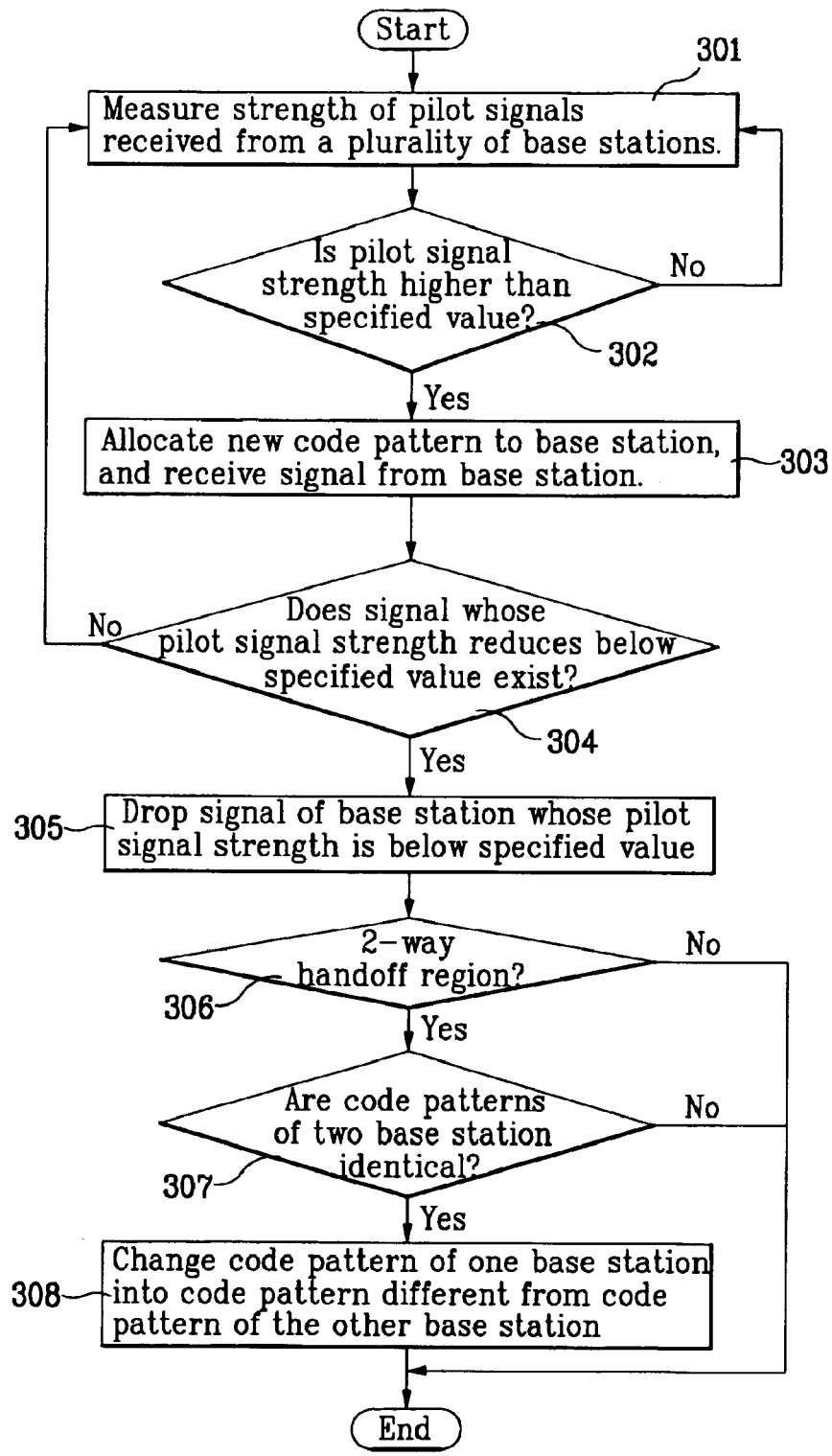
FIG. 5 is a flowchart illustrating a CCSH handoff method in a 3-way handoff region according to a first embodiment of the present invention.

Referring to FIG. 5, according to the CCSH handoff method in a 3-way handoff region according to the first preferred embodiment of the present invention, the mobile terminal first measures the strength of respective pilot signals received from a plurality of base stations (step 301), and determines whether the strength of the pilot signal received from the respective base station is higher than a prescribed value (step 302).

If the pilot signal of the received base station is higher than the prescribed value as a result of the determination at step 302, the Base Station Controller (BSC) allocates a new code pattern to the base station, and the mobile terminal receives the signal from the base station (step 303). At this time, in receiving the signals from all the neighboring base stations, the mobile station receives only the signals from the base stations whose pilot signal strength is higher than the prescribed value, and disregards the signals from other base stations. Also, the allocation of the code patterns to the base stations is performed by a base station controller (not illustrated) which receives information from the respective base stations. That is, the base station controller allocates different code patterns (default encoder type and/or complementary encoder type) in the 2-way handoff region, and allocates two code patterns to three base stations with the permission of overlapping.

The mobile terminal determines if any signal that is decreasing below the prescribed value exists among the received base station signals whose pilot signal strength was previously above the specified value (step 304). The mobile terminal then drops the signal that is below the prescribed value, and no longer receives the signal from the base station (step 305).

In case that a signal from a base station is dropped, the mobile terminal determines whether it is located in the 2-way handoff region (step 306). If the mobile terminal is determined to be located in the 2-way handoff region after dropping one base station signal, it means that the mobile terminal was in the 3-way handoff region prior to dropping the base station signal.

If the mobile terminal is in the 2-way handoff region as a result of judgement at step 306, it receives two base station signals, and the BSC determines whether the code patterns allocated to the two base stations are identical (step 307). If the code patterns are identical, the base station and the mobile terminal change the code pattern of one of the two base stations into a code pattern different from the code pattern of the other of the two base stations (step 308). As a result, the two base stations transmit signals encoded with different code patterns, and the mobile terminal receives, decodes, and combines the signals encoded with two code patterns, resulting in that the gain of the CCSH handoff method can be obtained.

If, however, the mobile terminal is not in the 2-way handoff region as a result of the determination at step 306, it corresponds to the case that the mobile terminal receives a signal from one base station in the 2-way handoff region or the case that the mobile terminal receives no signal from any base station. When the mobile terminal receives the signals from the two base stations, if the strength of a pilot signal received from a third base station besides the two base stations is higher than the prescribed value, the mobile terminal additionally receives the third signal from the base station by allocating a new code pattern to the base station. The mobile terminal consequently receives signals from the three base stations. If the strength of pilot signals received from the two base stations is lower than the prescribed value, the mobile terminal drops the signals of the base stations, resulting in the mobile terminal receiving the signal from one base station.

Also, when the mobile terminal receives the signal from one base station, if the strength of the pilot signal received from another base station is higher than the specified value, the mobile terminal additionally receives the signal from the base station by allocating a new code pattern to the base station. The mobile terminal thus receives the signals from the two or three base stations.

Meanwhile, when the mobile terminal changes the code pattern of a base station into a different code pattern, it is required that the code pattern changing time of the mobile terminal coincides with that of the base station. That is because the mobile terminal decodes the signal from the base station with the same code pattern as that of the base station.

Accordingly, when changing the code pattern of the base station signal, the code pattern changing time is determined so that the operations of the base station and the mobile terminal coincide with each other. Thus the base station and the mobile terminal simultaneously change the code pattern in accordance with the code pattern changing time.

Figures 6, 7:
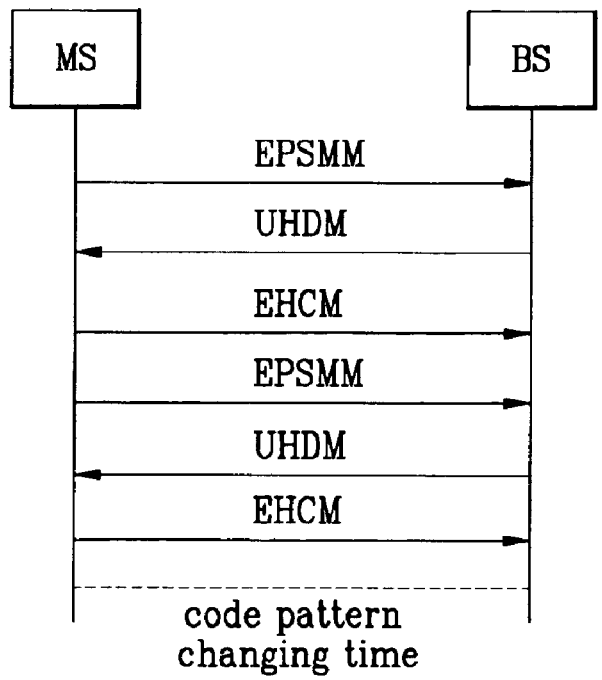
FIG. 6 is a drawing illustrating a UHDM field transmitted from a base station to a mobile terminal in a CCSH handoff method according to a first embodiment of the present invention.
FIG. 7 is a drawing explaining a code pattern changing time between a base station and a mobile terminal according to a first embodiment of the present invention.

As shown in FIG. 6, the code pattern changing time is defined in a CCSH_ENC_ACTION_TIME (also called SWAP_ACTION_TIME) field that is added to a UHDM sent from the base station to the mobile terminal. Accordingly, the code pattern is changed without affecting the handoff time, and this prevents the base station from transmitting an unnecessary signal.

The CCSH_ENC_ACTION_TIME field is preferably composed of 6 bits to define 64 kinds of code pattern changing times, and the code pattern changing time defined in the CCSH_ENC_ACTION_TIME field is defined in the unit of 80 ms that is the unit of a system time. For example, if the CCSH_ENC_ACTION_TIME field is 000001, 000010, and 000011, the code pattern changing time is defined as 80 ms, 160 ms, and 240 ms, respectively.

Also, it is preferable that the UHDM include information indicating whether to apply the code pattern changing time. The indication of whether to apply the code pattern changing time is defined in a USE_CCSH_ENC_TIME (also called USE_SWAP_TIME) field by adding the USE_CCSH_ENC_TIME field to the UHDM. For example, if the USE_CCSH_ENC_TIME field is 0, the code pattern changing time is not applied, and if the USE_CCSH_ENC_TIME field is 1, the base station and the mobile terminal simultaneously change the code pattern in accordance with the code pattern changing time defined in the CCSH_ENC_ACTION_TIME field.

Now, the change of the code pattern will be described in more detail with reference to FIGS. 2 and 6.

Figure 1:
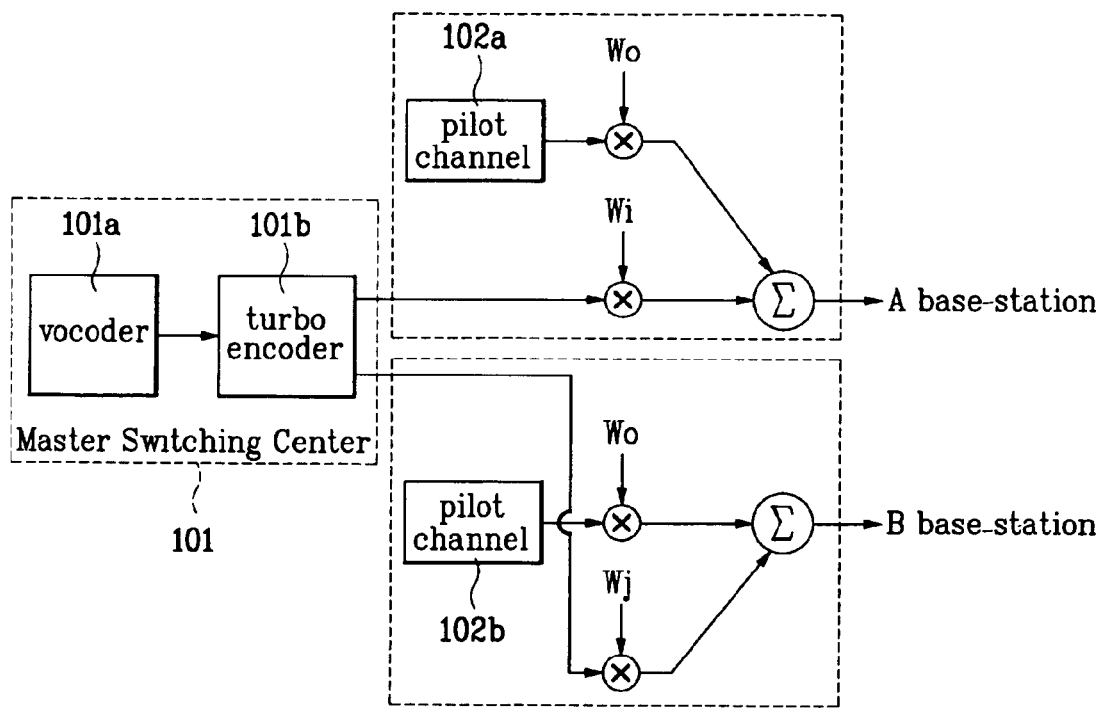
FIG. 1 is a block diagram of a transmission part in a CCSH handoff method.
Figure 2:
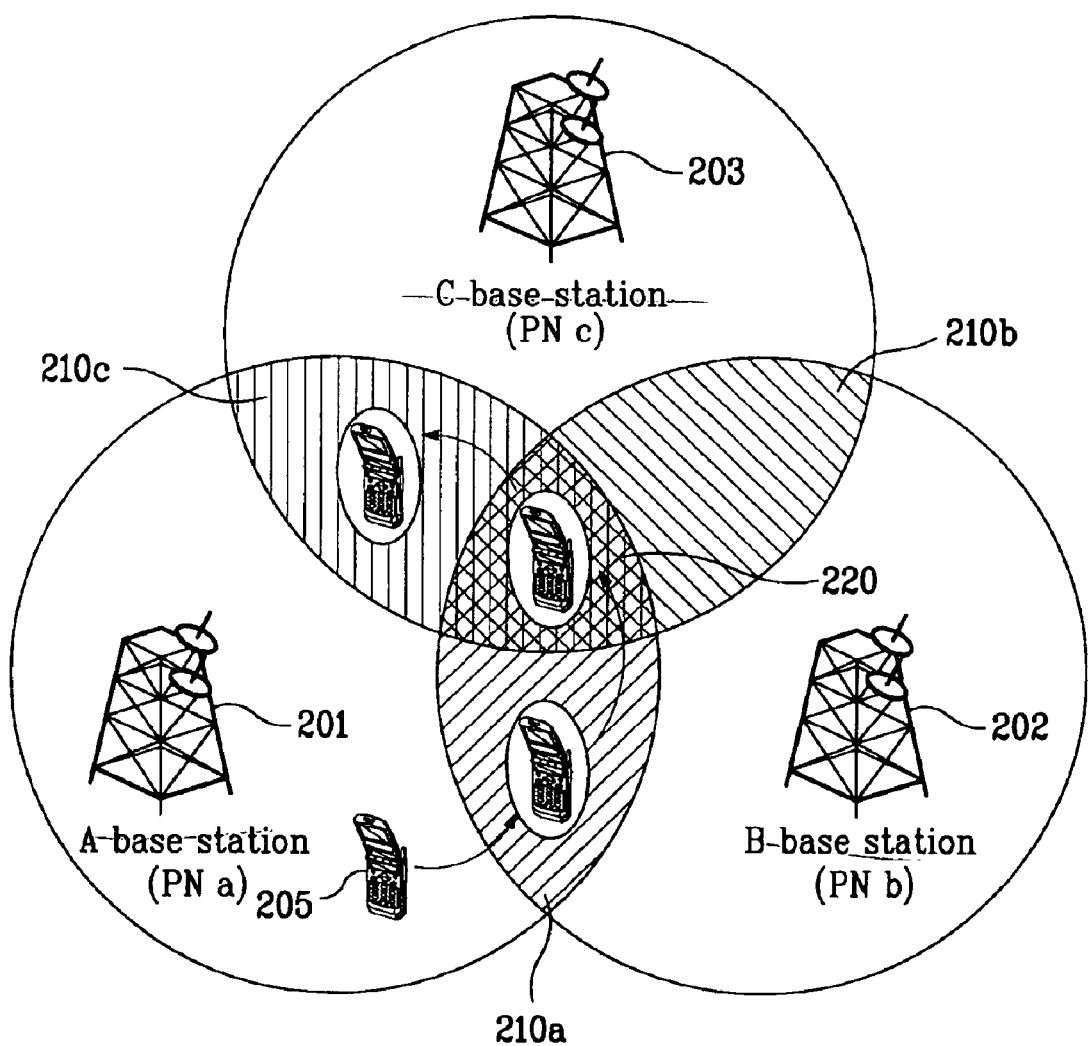
FIG. 2 is a drawing illustrating a CCSH handoff method.
Figures 3, 4:
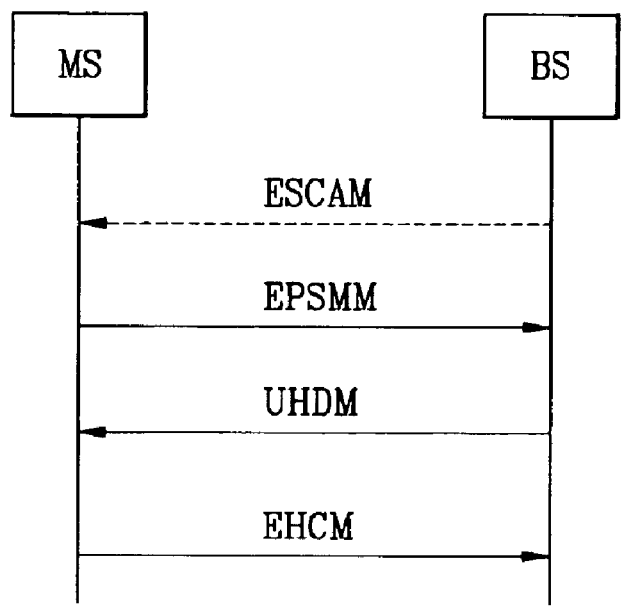
FIG. 3 is a drawing illustrating the signal process in a CCSH handoff method.
FIG. 4 is a view illustrating an ESCAM field transmitted from a base station to a mobile terminal in a related art CCSH handoff method.

Referring to FIGS. 2 and 6, if the mobile terminal 205 in the cell region of the A base station 201 is in an operation state, it receives the signal from the A base station 201, is allocated with a code pattern α, and thus receives the signal with the code pattern α.

At this time, the mobile terminal 205 receives an extended supplemental channel assignment message (ESCAM, and determines with which code pattern the mobile terminal 205 and the base station initially communicate.

If the mobile terminal 205 receives the signal with the code pattern α in the cell region of the A base station 201, and approaches the 2-way handoff region 210a of the A base station 201 and the B base station 202, the strength of the signal received from the B base station 202 becomes greater. The mobile terminal 205 detects whether the pilot signal strength of the signal received from the B base station 202 is higher than a prescribed value. If the pilot signal strength of the B base station 202 becomes higher than the prescribed value, the mobile terminal 205 transmits an extended pilot strength measurement message (EPSMM) to the respective base stations to indicate this, and the BSC allocates the code pattern allocated to the A base station 201 and another code pattern β to the B base station 202. The respective base stations transmit a universal handoff direction message (UHDM) to the mobile terminal 205 to indicate with which code pattern the signal is transmitted. The mobile terminal 205 receives the code pattern α from the A base station 201, receives the code pattern β from the B base station 202, and transmits an extended handoff completion message (EHCM) to indicate the completion of the handoff to the respective base stations.

As the mobile terminal 205, which is in the 2-way handoff region 210*a* of the A base station 201 and the B base station 202, approaches the C base station 203, the pilot signal strength of the signal received from the C base station 203 becomes greater. If the pilot signal strength of the C base station 203 becomes higher than the prescribed value, the BSC allocates to the C base station 203 either one of the code patterns allocated to the A base station 201 or to the B base station 202 to receive the signal from the C base station 203.

At this time, if the pilot signal strength of the C base station 203 becomes higher than the prescribed value, the mobile terminal 205 transmits the EPSMM to the respective base stations to indicate this, and the BSC allocates either one of the code patterns allocated to the A base station 201 or to the B base station 202, for example, the code pattern α, to the C base station 203. The respective base stations transmit the UHDM to the mobile terminal 205 to indicate with which code pattern the signal is transmitted. The mobile terminal 205 receives the signal of the code pattern α from the A base station 201 and the C base station 203, receives the signal of the code pattern β from the B base station 202, and transmits the EHCM to indicate the completion of the handoff to the respective base stations.

At this time, if the mobile terminal 205 in the 3-way handoff region 220 moves to the 2-way handoff region of the A base station 201 and the C base station 203, the signal of the B base station 202 is dropped, and the mobile terminal 205 receives the signals from the A base station 201 and the C base station 203. Since both the A base station 201 and the C base station 203 use the code pattern α, the gain of the CCSH handoff method cannot be obtained, and thus one of the code patterns of the base stations should be changed to obtain the gain as described above.

Specifically, as the mobile terminal 205 moves to the 2-way handoff region 210*c* of the A and C base stations 201 and 203, the signal of the B base station 202 becomes weak. If the pilot signal of the B base station 202 becomes lower than the prescribed value, the mobile terminal 205 transmits the EPSMM to the respective base stations. According to the EPSMM, the signal of the B base station 202 is dropped, the A base station 201 and the C base station 203 are determined to be in an active state, and the UHDM for receiving the signals from the A base station 201 and the C base station 203 is transmitted to the mobile terminal 205. In accordance with the information of the UHDM, the mobile terminal 205 drops the signal of the B base station 202, and transmits the EHCM for informing the completion of the handoff to the respective active-state base stations to complete the actual handoff.

Since the UHDM includes the PUNCTURE_PATTERN field indicating information on which code pattern the C base station 203 uses, and the changed code pattern, and the CCSH_ENC_ACTION_TIME field indicating information on when the C base station 203 changes the code pattern, the C base station 203 and the mobile terminal 205 simultaneously change the code pattern in accordance with the code pattern changing time.

As described above, the code pattern changing time is defined in the CCSH_ENC_ACTION_TIME field that is added to the UHDM. The CCSH_ENC_ACTION_TIME field is preferably composed of 6 bits to define 64 kinds of code pattern changing times, and the code pattern changing time defined in the CCSH_ENC_ACTION_TIME field is defined in the unit of 80 ms that is the unit of the system time.

Also, whether to apply the CCSH_ENC_ACTION_TIME is defined in a USE_CCSH_ENC_TIME field in the UHDM. For example, if the USE_CCSH_ENC_TIME field is 0, the CCSH_ENC_ACTION_TIME is not applied. If the USE_CCSH_ENC_TIME field is 1, the CCSH_ENC_ACTION_TIME is applied.

Accordingly, when the mobile terminal receives the UHDM message, the handoff is completed by dropping the signal of the B base station 202 and transmitting the EHCM. At this time, the C base station and the mobile terminal 205 simultaneously change the code pattern in accordance with the code pattern changing time, and the signal of the C base station 203 is transmitted to the mobile terminal.

As described above, since the mobile terminal 205 always receives the signals of the different code patterns, the gain of the CCSH handoff method can be obtained in any handoff region.

Second Embodiment

Figure 8:
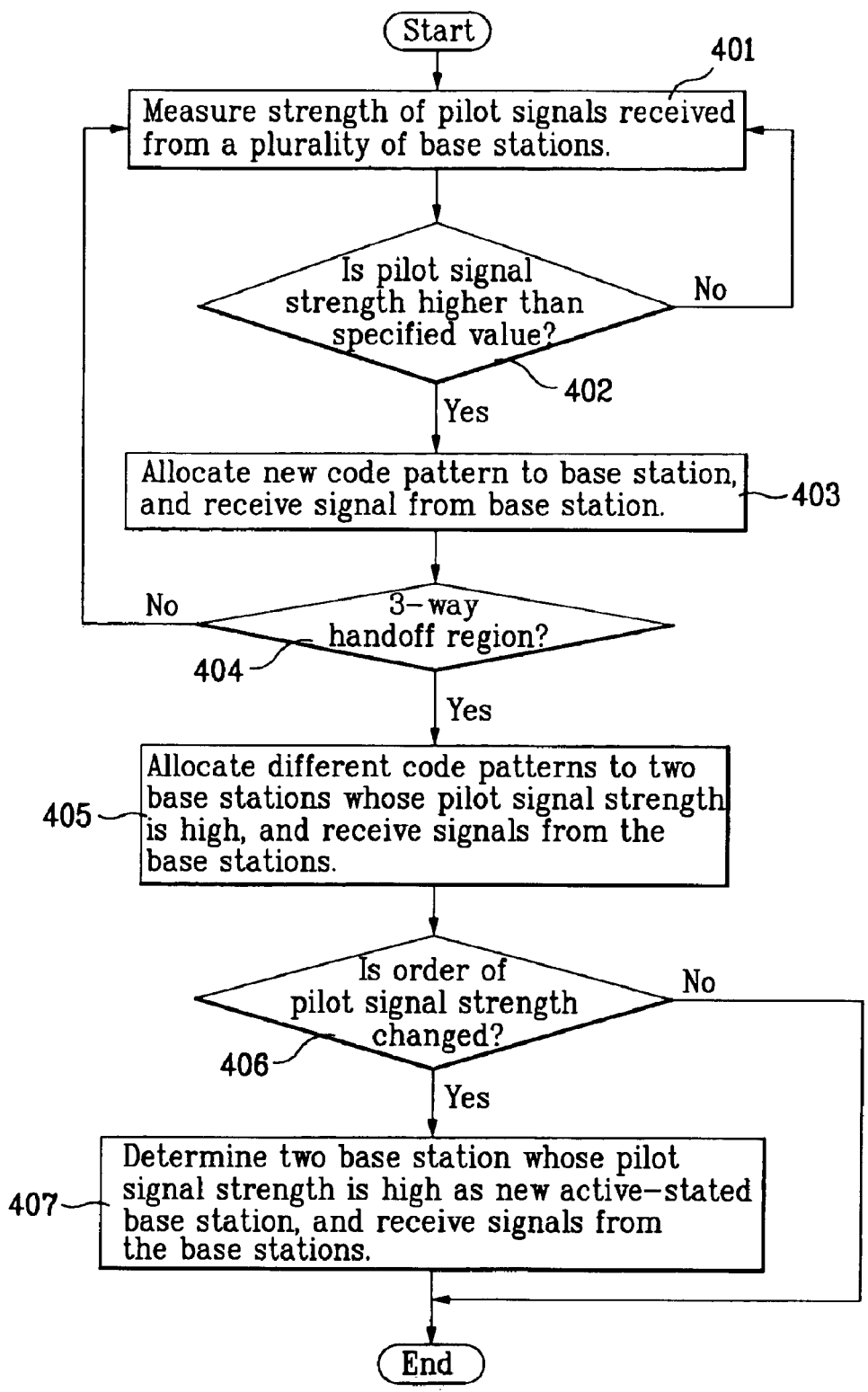
FIG. 8 is a flowchart illustrating a CCSH handoff method in a 3-way handoff region according to a second embodiment of the present invention.

Referring to FIG. 8, according to the CCSH handoff method in a 3-way handoff region according to the second embodiment of the present invention, the mobile terminal first measures the strength of respective pilot signals received from a plurality of base stations (step 401), and determines whether the strength of the pilot signal received from the respective base station is higher than a prescribed value (step 402). If the received pilot signal of the base station is higher than the prescribed value as a result of judgment at step 402, the BSC allocates a new code pattern to the base station, and receives the signal from the base station (step 403).

At this time, in receiving the signals from all the neighboring base stations, the mobile station receives only the signals from the base stations whose pilot signal strength is higher than the prescribed value, and disregards the signals from other base stations.

Also, the allocation of the code patterns to the base stations is performed by a base station controller (not illustrated) which receives information from the respective base stations. That is, the base station controller allocates different code patterns in the 2-way handoff region, and as described above, which code pattern is allocated to a base station is defined in the PILOT_PN and the PUNCTURE_PATTERN fields of the UHDM from the base station to the mobile terminal.

The mobile terminal determines if it is in the 3-way handoff region (step 404), and if the mobile terminal is determined to be in the 3-way handoff region, the BSC allocates different code patterns to the two base stations whose pilot signal strength is high among the three base stations to determine the two base stations as in the active state, and then receives the signals from the two active-state base stations (step 405).

Here, if the mobile terminal is located in the 3-way handoff region, it means that the mobile terminal has received the three base station signals.

The determination of the base stations as in the active state at step 405 is performed when the mobile terminal, which is receiving the signal from one base station, moves to the 3-way handoff region, when the mobile terminal moves from the 2-way handoff region to the 3-way handoff region, and when the mobile terminal moves from the 3-way handoff region to the 2-way handoff region, respectively. The respective cases will now be explained.

In FIG. 9, (a) indicates the order of the pilot signal strength of the respective base station in the 3-way handoff region, and (b) indicates the base stations determined as in the active state for the pilot signal strength as shown as (a) in FIG. 9.

First, if the mobile terminal, which is receiving the signal from one base station, moves to the 3-way handoff region, and receives the signals from the two active-state base stations whose pilot signal strength is high, it maintains the code pattern allocated to the base station from which it receives the signal as it is, and allocates to the base station newly determined as in the active state a code pattern different from that of the base station from which it receives the signal.

At this time, if the base station from which the mobile terminal receives the signal is not determined to be in the active state in the 3-way handoff region 220, the BSC allocates the different code patterns to the two base stations newly determined as in the active state.

For example, if the mobile terminal 205, which is receiving the signal from the cell region of the A base station 201, moves to the 3-way handoff region 220, the BSC allocates the different code patterns to the two base stations whose pilot signal strengths are high among the three base stations in the 3-way handoff region 220 to receive the signals from the two base stations. At this time, if the pilot signal of the A base station 201 and the B base station 202 is higher than the pilot signal of the C base station 203, the BSC allocates the same code pattern as that previously received to the A base station 201, and allocates the code pattern different from that of the A base station 201 from which the mobile terminal receives the signal to the B base station 202 newly determined as in the active state.

If the pilot signal strength of the A base station 201 is lower than the pilot signal strength of the B base station 202 and the C base station 203 in the 3-way handoff region 220, the base stations determined as in the active state in the 3-way handoff region are the B base station 202 and the C base station 203. In this case, the mobile terminal drops the signal of the A base station 201, and the BSC allocates the different code patterns to the B base station 202 and the C base station 203, respectively, to receive the signals of the B base station 202 and the C base station 203.

Also, if the mobile terminal moves from the 2-way handoff region 210a, 210b, or 210c where the mobile terminal receives the signals from the two base stations to the 3-way handoff region 220, and receives the signals from the two active-state base stations whose pilot signal strengths are high, it maintains the code patterns allocated to the active-state base stations from which it receives the signals as they are, and the BSC allocates the code pattern different from those of the active-state base stations to the base station newly determined to be in the active state to receive the signal from the base station.

For example, assume that the base stations determined to be in the active state in the 3-way handoff region 220 are the B base station 202 and the C base station 203. When the mobile terminal moves from the 2-way handoff region 210a where the mobile terminal receives the signals from the A base station 201 and the B base station 202 to the 3-way handoff region 220, the BSC allocates to the B base station 202 the same code pattern as in the 2-way handoff region 210a where the mobile terminal previously received the signals. The mobile station also allocates to the C base station 203 the code pattern different from the B base station 202 to receive the signal from the C base station 203.

If the mobile terminal, which receives the signals from the two active-state base stations having the highest pilot signal strength in the 3-way handoff region 220, moves to the 2-way handoff region 210a, 210b, or 210c, the mobile terminal receives the signals from the base stations corresponding to the 2-way handoff region 210a, 210b, or 210c, maintains the code patterns allocated to the active-state base stations from which the mobile terminal receives the signals as they are, and the BSC allocates to the base station newly determined as in the active state the code pattern different from the base stations from which the mobile terminal receives the signals.

For example, when the mobile terminal moves from the 3-way handoff region 220 where the active-state base stations are the B base station 202 and the C base station 203 to the 2-way handoff region 210a of the A base station 201 and the B base station 202, when the mobile terminal is in the 2-way handoff region 210b of the B base station 202 and the C base station 203, the BSC allocates to the B base station 202 the same code pattern as in the 3-way handoff region 220, and allocates to the A base station 201 the code pattern different from the B base station 202 to receive the signals from the B base station 202 and the A base station 201.

Meanwhile, in a state that the mobile terminal receives the signals from the two active-state base stations having the highest pilot signal strength in the 3-way handoff region 220, the mobile terminal determines whether the order of the pilot signal strength of all the base stations in the 3-way handoff region 220 (step 406) has changed. If the pilot signal strength of the base station, which is in the 3-way handoff region 220, but from which no signal is received since its pilot signal strength is weak, becomes higher than the pilot signal strength of the active-state base stations, the mobile terminal determines the subject base station as a new active-state base station to receive the signal therefrom, and drops the signal of the base station whose pilot signal strength is lower than the pilot signal strength of the subject base station.

At this time, it is preferable that the BSC allocate to the subject base station the code pattern allocated to the base station whose signal is dropped, so that the different code patterns are allocated to the two active-state base stations.

For example, assume that the pilot signal strength of the C base station 203 becomes higher than the pilot signal strength of the B base station 202 in a state that the A base station 201 and the B base station 202 are determined in the active state in the 3-way handoff region 220. The mobile terminal, which receives the signals from the A base station 201 and the B base station 202, drops the signal of the B base station 202, and allocates to the C base station 203 the code pattern previously allocated to the B base station 202. The mobile terminal thus receives the signals from the A base station 201 and the C base station 203.

As described above, even in the 3-way handoff region 220, the two base stations transmit signals encoded with different code patterns, and the mobile terminal receives, decodes, and combines the signals encoded with the two code patterns. The gain of the CCSH handoff method can thus be obtained.

Now, an operation of the second preferred embodiment as the mobile terminal moves will be further described.

As described above, if the mobile terminal 205 in the cell region of the A base station 201 is in an operation state, it receives the signal from the A base station 201, is allocated with a code pattern α, and thus receives the signal with the code pattern α.

At this time, the mobile terminal 205 receives the extended supplemental channel assignment message (ESCAM), and determines with which code pattern the mobile terminal 205 and the base station initially communicate.

At this time, if the mobile terminal 205 receives the signal with the code pattern a in the cell region of the A base station 201, and approaches the 2-way handoff region 210a of the A base station 201 and the B base station 202, the strength of the signal received from the B base station 202 becomes greater. The mobile terminal 205 detects whether the pilot signal strength of the signal received from the B base station 202 is higher than a prescribed value. If the pilot signal strength of the B base station 202 becomes higher than the prescribed value, the mobile terminal 205 transmits the extended pilot strength measurement message (EPSMM to the respective base stations to so indicate.

Then, the BSC allocates the code pattern allocated to the A base station 201 and another code pattern β to the B base station 202, and the respective base stations transmit the universal handoff direction message (UHDM) to the mobile terminal 205 to indicate which code pattern the signal is transmitted with. The mobile terminal 205 receives the signal with the code pattern α from the A base station 201, receives the signal with the code pattern β from the B base station 202, and transmits the extended handoff completion message (EHCM) to indicate that the completion of the handoff to the respective base stations.

If the mobile terminal 205, which is in the 2-way handoff region 210a of the A base station 201 and the B base station 202, approaches the C base station 203, the pilot signal strength of the signal received from the C base station 203 becomes greater. If the pilot signal strength of the C base station 203 becomes higher than the specified value, the mobile terminal 205 transmits the EPSMM to the respective base stations to so indicate.

At this time, the mobile terminal 205 moves to the 3-way handoff region 220, where the mobile terminal receives the signals from the three base stations. If the pilot signals of two base stations whose pilot signal strengths are high, for example, the pilot signals of the A base station 201 and the C base station 203, are higher than the pilot signal of the B base station 202, the base station controller (not illustrated) drops the signal of the B base station 202. The base station controller also determines the A base station 201 and the C base station 203 to be in the active state, allocates the different code patterns to the two base stations, and transmits the UHDM to the mobile terminal 205. The mobile terminal 205 thus receives the signals from the two active-state base stations.

Since the A base station 201 is in the active state even in the 2-way handoff region 210a, the code pattern α, which is the same code pattern as in the 2-way handoff region 210a, is allocated to the A base station 201 in the 3-way handoff region 220. The code pattern β, which is the code pattern allocated to the B base station 202 whose signal is dropped, is allocated to the C base station 203. Accordingly, the mobile terminal 205 receives the signal of the code pattern α from the A base station 201, receives the signal of the code pattern β from the C base station 203, and transmits the EHCM to indicate the completion of the handoff to the respective base stations.

If the mobile terminal 205 in the 3-way handoff region 220 moves to the 2-way handoff region 210c of the A base station 201 and the C base station 203, the signal of the B base station 202 is dropped, and the mobile terminal 205 receives the signals from the A base station 201 and the C base station 203. Since both the A base station 201 and the C base station 203 were in the active state in the 3-way handoff region 220, the BSC allocates the same code patterns to these stations as in the 3-way handoff region 220. Thus, the mobile terminal 205 receives the signal of the code pattern α from the A base station 201 and the signal of the code pattern β from the C base station 203.

If the mobile terminal 205 in the 3-way handoff region 220 moves to the 2-way handoff region 210a of the A base station 201 and the B base station 202, the signal of the C base station 203 is dropped, and the mobile terminal 205 receives the signals from the A base station 201 and the B base station 202. Since the A base station 201 was in the active state in the 3-way handoff region 220, the BSC allocates the same code pattern as in the 3-way handoff region 220 to the A base station 201, and the code pattern β allocated to the C base station 203 whose signal is dropped to the B base station 202. Thus, the mobile terminal 205 receives the signal of the code pattern α from the A base station 201, and the signal of the code pattern β from the B base station 202.

Also, if the mobile terminal 205 in the 3-way handoff region 220 moves to the 2-way handoff region 210b of the B base station 202 and the C base station 203, the signal of the A base station 201 is dropped, and the mobile terminal 205 receives the signals from the B base station 202 and the C base station 203. Since the C base station 203 was in the active state in the 3-way handoff region 220, the BSC allocates the same code pattern as in the 3-way handoff region 220 to the C base station 203, and allocates the code pattern α to the B base station 202. Thus, the mobile terminal 205 receives the signal of the code pattern β from the C base station 203, and the signal of the code pattern α from the B base station 202.

While the mobile terminal 205 is in the 3-way handoff region 220 where the A base station 201 and the C base station 203 are in the active state, the mobile terminal will check whether the order of the pilot signal strength of all the base stations 201, 202, and 203 corresponding to the 3-way handoff region 220 has changed. If the pilot signal strength of the B base station 202, that is the subject base station from which the mobile terminal does not receive the signal, becomes higher than the pilot signal strength of the C base station 203, the mobile terminal drops the signal of the C base station 203, determines the B base station 202 as a new active-state base station, and the BSC allocates to the B base station 202 the code pattern β, which was allocated to the C base station 203. Thus, the mobile terminal 205 receives the code pattern α from the A base station 201, and the code pattern β from the B base station 202.

As described above, the CCSH handoff method according to the preferred embodiments has many advantages. For example, since the mobile terminal 205 receives the signals of the different code patterns from the base stations, the gain of the CCSH handoff method can be obtained in any handoff region.

Additionally, the gain of the CCSH handoff method can be obtained by changing the code pattern of either one of two base stations in a 2-way handoff region into a code pattern different from the code pattern of the other base station if the code patterns allocated to the two base stations in the 2-way handoff region are identical when a mobile terminal moves from a 3-way handoff region to the 2-way handoff region. The mobile terminal thus always receives signals encoded by the two different code patterns from the base stations.

Moreover, the gain of the CCSH handoff method can be obtained by allocating the different code patterns to the two base stations whose pilot signal strength is high among the three base stations so that the mobile terminal always receives the signals encoded by the two different code patterns in the handoff region when the mobile terminal moves to the 3-way handoff region.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A code combining soft handoff (CCSH) method, comprising:

measuring a strength of respective pilot signals of a plurality of base stations;

if the strength of the respective received pilot signal is higher than a first prescribed value, using a first code pattern of a corresponding base station to decode a coded signal from the corresponding base station, and if the strength of the received pilot signal is lower than a second prescribed value, dropping a signal of the corresponding base station;

receiving the coded signals from remaining base stations; and changing a first code pattern for a signal used by one of the remaining base stations to a second code pattern different from the first code pattern if the code patterns for signals used by the remaining base stations are the same, wherein the change of the code pattern from the first to the second code pattern is performed at a prescribed time to match a code pattern changing time between at least one of the remaining base stations and a mobile terminal, the code pattern changing time is defined in a time field of a universal handoff direction message (UHDM) sent from at least one of the remaining base stations to the mobile terminal.

2. The method of claim 1, wherein the time field comprises 6 bits to define 64 code pattern changing times, and the code pattern changing time defined in the time field is defined in a system time unit.

3. The method of claim 2, wherein the system time unit is 80 ms, and wherein the time field is a SWAP_ACTION_TIME field.

4. The method of claim 1, wherein the UHDM further comprises a swap indicator field, to indicate if the time field is to be used for swapping from the first code pattern to the second code pattern.

5. The method of claim 1, wherein a determination of whether to apply the code pattern changing time is defined in the UHDM sent from the corresponding base station to the mobile terminal.

6. The method of claim 5, wherein a determination of whether to apply the code pattern changing time is defined in a USE_SWAP_TIME field of the UHDM.

7. A handoff method for a communication system, comprising:

measuring a strength of pilot signals received from a plurality of base stations;

if the strength of the received pilot signal is higher than a prescribed value, allocating a new code pattern to a corresponding base station to receive a signal from the base station, and if the strength of the received pilot signal is lower than the prescribed value, dropping a signal of the corresponding base station; and if signals are received from three base stations, allocating different code patterns to the signals from two of the three base stations whose pilot signal strengths are highest among the signals from the three base stations, and receiving the signals from the two active-state base stations, the method further comprising maintaining the code pattern allocated to a first base station and allocating a code pattern different from the code pattern of the first base station to a second base station newly determined as in the active state to receive the signal having a different code from the second base station when the mobile terminal moves to a 3-way handoff region and receives signals from the two active-state base stations whose pilot signal strength is high.

8. A handoff method for a communication system, comprising:

measuring a strength of pilot signals received from a plurality of base stations;

if the strength of the received pilot signal is higher than a prescribed value, allocating a new code pattern to a corresponding base station to receive a signal from the base station, and if the strength of the received pilot signal is lower than the prescribed value, dropping a signal of the corresponding base station; and if signals are received from three base stations, allocating different code patterns to the signals from two of the three base stations whose pilot signal strengths are highest among the signals from the three base stations, and receiving the signals from the two active-state base stations, wherein if the second base station is not in the active state in the 3-way handoff region, the a base station controller allocates the different code patterns to the two base stations newly determined as in the active state to receive the signals from the two active-state base stations.

9. A handoff method for a communication system, comprising:

measuring a strength of pilot signals received from a plurality of base stations;

if the strength of the received pilot signal is higher than a prescribed value, allocating a new code pattern to a corresponding base station to receive a signal from the base station, and if the strength of the received pilot signal is lower than the prescribed value, dropping a signal of the corresponding base station; and if signals are received from three base stations, allocating different code patterns to the signals from two of the three base stations whose pilot signal strengths are highest among the signals from the three base stations, and receiving the signals from the two active-state base stations, wherein if a mobile terminal moves from a 2-way handoff region where the mobile terminal receives the signals from first and second base stations to the 3-way handoff region where the mobile station receives signals from first, second, and third base stations, and receives the signals from the two base stations whose pilot signal strengths are high, the mobile terminal maintains the code pattern allocated to the first base station and a base station controller allocates a code pattern different from the code pattern of the first base station to the base station whose pilot signal strength is high to receive the signals from the two active-state base stations with different codes.

10. A handoff method for a communication system, comprising:

measuring a strength of pilot signals received from a plurality of base stations;

if the strength of the received pilot signal is higher than a prescribed value, allocating a new code pattern to a corresponding base station to receive a signal from the base station, and if the strength of the received pilot signal is lower than the prescribed value, dropping a signal of the corresponding base station; and if signals are received from three base stations, allocating different code patterns to the signals from two of the three base stations whose pilot signal strengths are highest among the signals from the three base stations, and receiving the signals from the two active-state base stations, wherein if the mobile terminal, while receiving the signals from the two active-stated base stations whose pilot signal strength is high in the 3-way handoff region, moves to a 2-way handoff region, and receives signals from the base stations corresponding to the 2-way handoff region, the mobile terminal maintains the code pattern allocated to the base station which is determined to be in the active state and from which the mobile terminal receives the signal, and a base station controller allocates a code pattern different from the code pattern of the base station from which the mobile terminal receives the signal to the base station newly determined as in the active state to receive the signals from the two active-state base stations.

11. A handoff method for a communication system, comprising:

measuring a strength of pilot signals received from a plurality of base stations;

if the strength of the received pilot signal is higher than a prescribed value, allocating a new code pattern to a corresponding base station to receive a signal from the base station, and if the strength of the received pilot signal is lower than the prescribed value, dropping a signal of the corresponding base station; and if signals are received from three base stations, allocating different code patterns to the signals from two of the three base stations whose pilot signal strengths are highest among the signals from the three base stations, and receiving the signals from the two active-state base stations, wherein if the pilot signal strength of the subject base station from which the mobile terminal does not receive the signal becomes higher than the pilot signal strength of the active-state base station in a state that the mobile terminal receives the signals from the two active-state base stations whose pilot signal strength is high in the 3-way handoff region, the mobile terminal determines the subject base station as the new active-state base station to receive the signal therefrom, drops the signal from the base station having the pilot signal whose strength is lower than the pilot signal strength of the subject base station, and a base station controller allocates the different code patterns to the two active-state base stations by allocating the code pattern allocated to the dropped base station to the subject base station to receive the signals from the two active-state base stations.

12. A Universal Handoff Direction Message for a code combining soft handoff, comprising a field for indicating a time that a mobile station and a base station are to change from a first puncturing pattern to a second puncturing pattern, wherein the field comprises a first predetermined number of bits to define a second predetermined number of puncturing code pattern changing times, and wherein a puncturing code pattern changing time defined in the field is defined in system time units, the first predetermined number is 6 and the second predetermined number is 64.

13. The Message of claim 12, wherein the second puncturing code pattern is complementary to the first puncturing code pattern.

14. The Message of claim 12, wherein at least one of the first puncturing code pattern and the second puncturing code pattern determines a type of turbo encoder.

15. A method for transmitting a Universal Handoff Direction Message as recited in claim 12, said method including:

transmitting said Message from a base station to a mobile station when the base station is going to swap the first puncturing pattern for the second puncturing pattern.

16. A universal handoff direction message sent from at least one of a plurality of base stations to a mobile station, comprising:

(a) a field for providing a prescribed time for swapping a first prescribed turbo encoder type to a second prescribed turbo encoder type; and (b) a first indicator for indicating that the prescribed time of the field is to be used for swapping from the first turbo encoder type to the second turbo encoder type, (c) wherein each base station uses one of the first and second prescribed turbo encoder types, and the universal handoff direction message is sent during a code combining soft handoff, wherein the field corresponds to a CCSH_ENCODER_ACTION_TIME field and the first indicator corresponds to a USE_CCSH_ENCODER_TIME indicator, and the first indicator is "0" if the field is not used or the first indicator is "1" if the field is used.

17. The universal handoff direction message of claim 16, wherein the prescribed time is defined in system time units, and the system time unit is 80 ms.

18. The universal handoff direction message of claim 16, further comprising a Pilot_PN field.

19. A universal handoff direction message sent from at least one of a plurality of base stations to a mobile station, comprising:

(a) a field for providing a prescribed time for swapping a first prescribed turbo encoder type to a second prescribed turbo encoder type; and (b) a first indicator for indicating that the prescribed time of the field is to be used for swapping from the first turbo encoder type to the second turbo encoder type, (c) wherein each base station uses one of the first and second prescribed turbo encoder types, and the universal handoff direction message is sent during a code combining soft handoff, wherein the prescribed time is defined in units of a system time, and the system time unit is 80 ms.

20. The universal handoff direction message of claim 19, wherein the field corresponds to a CCSH_ENCODER_ACTION_TIME field and the first indicator corresponds to a USE_CCSH_ENCODER_TIME indicator in the universal handoff direction message, and the first indicator is "0" if the field is not used or the indicator is "1" if the field is used.

21. The universal handoff direction message of claim 19, further comprising a Pilot_PN field.

22. The universal handoff direction message of claim 19 or 17, wherein the field comprises 6 bits for defining 64 different system times units.

23. A code combining soft hand off method comprising:
(a) receiving signals from first, second and third base stations within a handoff region, at least one of the first, second or third base stations using a turbo encoder type which is different from the other base stations;
(b) sending a pilot strength measurement message when a strength of a pilot signal of a second base station is below a prescribed value;
(c) receiving a universal handoff direction message;
(d) using the first and third base stations as active base stations; and
(e) sending a message indicating a completion of a handoff,
(f) wherein when the turbo encoder types of the first and third base stations are the same, changing the turbo encoder type of one of the first and third base stations to be different based upon information of the universal handoff direction message.

24. The code combining method of claim 23, wherein the universal handoff direction message includes:
(a) a field for providing a prescribed time for swapping to the different turbo encoder type; and
(b) an indicator for indicating that the prescribed time of the field is to be used for swapping to the different turbo encoder type, wherein
the prescribed time allows simultaneous swapping to the different turbo encoder type between the mobile station and one of the first and third base stations.

25. The code combining soft handoff method of claim 24, wherein the prescribed time is defined in units of a system time.

26. The code combining soft handoff method of claim 25, wherein the system time unit is 80 ms.

27. The code combining soft handoff method of claim 25 or 26, wherein the field comprises 6 bits for defining 64 different system times.

28. The code combining soft handoff method of claim 24, 25, or 26, wherein the field corresponds to a CCSH_ENCODER_ACTION_TIME field and the indicator corresponds to a USE_CCSH_ENCODER_TIME indicator in the universal handoff direction message, and the indicator is "0" if the field is not used or the indicator is "1" if the field is used.

29. The code combining soft handoff method of claim 23 or 24, wherein the different turbo encoder type is a complementary turbo encoder type.

30. The code combining soft handoff method of claim 29, wherein the complementary turbo encoder type provides a code using a puncturing pattern different from a default turbo encoder type.

31. The code combining soft handoff method of 30, wherein a PUNCTURE_PATTERN field or a CCSH_ENCODER_TYPE field provide the information regarding the different puncture code patterns.

32. The code combining soft handoff method of claim 31, wherein the PUNCTURE_PATTERN field or the CCSH_ENCODER_TYPE field is provided in an extended supplemental channel assignment message.

33. The code combining soft handoff method of claim 23, wherein the pilot strength measurement message is an extended pilot strength measurement message.

34. The code combining soft handoff method of claim 23 or 33, wherein the message is an extended handoff completion message.

35. A method of performing code combining soft handoff (CCSH) in a communication system in which at least two base stations using a same puncturing pattern type communicate with a mobile terminal in a handoff region, comprising:
transmitting a message from at least one of the base stations to a mobile terminal when a puncturing pattern type of one of the base stations needs to be changed to a different puncturing pattern type; and
changing the current puncturing pattern type to the different puncturing pattern type according to information of the message, wherein the message comprises a changing time field to inform a time to change to the different puncturing pattern, and a changing action time of a turbo encoder is based on the time.

36. The method of claim 35, wherein the time is set in units of a system time of 80 ms.

37. A method of performing code combining soft handoff (CCSH) in a communication system in which at least two base stations using a same puncturing pattern type communicate with a mobile terminal in a handoff region, comprising:
transmitting a message from at least one of the base stations to a mobile terminal when a puncturing pattern type of one of the base stations needs to be changed to a different puncturing pattern type; and
changing the current puncturing pattern type to the different puncturing pattern type according to information of the message, wherein the message is a universal handoff direction message, and wherein the universal handoff direction message includes:
(a) a field for providing a prescribed time for swapping to the different puncturing pattern type; and
(b) an indicator for indicating that the prescribed time of the field is to be used for swapping to the different puncturing pattern type.

38. The method of claim 37, wherein the universal handoff direction message further comprises a puncturing pattern type indicator for indicating a puncturing pattern type.

39. The method of claim 37, wherein the field corresponds to a CCSH_ENCODER_ACTION_TIME field and the indicator corresponds to a USE_CCSH_ENCODER_TIME indicator in the universal handoff direction message, and the indicator is "0" if the field is not used or the indicator is "0" if the field is used.

40. The method of claim 37, wherein the prescribed time is defined in units of a system time, and the system time unit is 80 ms.

41. A subscriber unit of a mobile communication system, comprising:

means for communicating with a first base station and a second base station using a puncturing pattern type during soft handoff;

means for receiving a universal handoff direction message (UHDM) including information for another puncturing pattern type which will be used by one of the first and second base stations;

means for transmitting a handoff complete message to the base stations; and means for synchronizing a change of the puncturing pattern type which will be used by one of the first and the second base stations to another puncturing pattern type at a prescribed time based on the information of the universal handoff direction message, wherein the prescribed time is defined in units of a system time and a system time unit is 80 ms.

42. The subscribing unit of claim 41, wherein the information includes the prescribed time, and a changing action time of a turbo encoder is based on the prescribed time.

43. A code combining soft handoff method, comprising
(a) receiving signals from a first base station, the first base station having a first encoder output;
(b) sending a pilot strength measurement message when a strength of a pilot signal of a second base station exceeds a prescribed value, wherein the second base station has a second encoder output;
(c) receiving a universal handoff direction message; and
(d) sending a handoff completion message,
(e) wherein when the first and second encoder outputs of the first and second base stations, respectively, are the same, changing the output of the first base station to be different from the output of the second base station based upon information of the universal handoff direction message.

44. The code combining soft handoff method of claim 43, wherein the universal handoff direction message includes:
(a) a field for providing a prescribed time for swapping to the different output; and
(b) an indicator for indicating that the prescribed time of the field is to be used for swapping to the different output, wherein
the prescribed time allows simultaneous swapping to the different output between the mobile station and one of the first and second base stations.

45. The code combining soft handoff method of claim 44, wherein the prescribed time is defined in units of a system time.

46. The code combining soft handoff method of method of claim 45, wherein the system time unit is 80 ms.

47. The code combining soft handoff method of claim 45, wherein the field comprises 6 bits for defining 64 different system times.

48. The code combining soft handoff method of claim 44, wherein the field corresponds to a CCSH_ENCODER_ACTION_TIME field and the indicator corresponds to a USE32CCSH_ENCODER_TIME indicator in the universal handoff direction message, and the indicator is "0" if the field is not used or the indicator is "1" if the field is used.

49. The code combining soft handoff method of claim 43, wherein the pilot strength measurement message is an extended pilot strength measurement message.

50. The code combining soft handoff method of claim 49, wherein the handoff completion message is an extended handoff completion message.

51. The code combining soft handoff method of claim 50, wherein a PUNCTURE_PATTERN field or a CCSH_ENCODER_TYPE field is provided in the extended supplemental channel assignment message.

* * * * *